United States Patent
Iwano et al.

(10) Patent No.: US 10,153,520 B2
(45) Date of Patent: Dec. 11, 2018

(54) MANUFACTURING METHOD FOR ALL-SOLID-STATE BATTERY, MANUFACTURING APPARATUS FOR ALL-SOLID-STATE BATTERY, AND ALL-SOLID-STATE BATTERY

(71) Applicant: TOYOTA JIDOSHA KABUSHIKI KAISHA, Toyota-shi, Aichi-ken (JP)

(72) Inventors: Yoshihiro Iwano, Toyota (JP); Akira Tsujiko, Toyota (JP); Fuhito Kamata, Otsu (JP); Tomonori Kawamura, Otsu (JP); Mikio Kawakami, Otsu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/606,499

(22) Filed: May 26, 2017

(65) Prior Publication Data

US 2017/0352923 A1 Dec. 7, 2017

(30) Foreign Application Priority Data

Jun. 1, 2016 (JP) .................................. 2016-110448
Feb. 3, 2017 (JP) .................................. 2017-018947

(51) Int. Cl.
*H01M 4/00* (2006.01)
*H01M 10/0585* (2010.01)
(Continued)

(52) U.S. Cl.
CPC ..... *H01M 10/0585* (2013.01); *B32B 37/1009* (2013.01); *B32B 38/00* (2013.01);
(Continued)

(58) Field of Classification Search
CPC ..................................................... H01M 4/00
See application file for complete search history.

(56) References Cited

U.S. PATENT DOCUMENTS

2004/0253512 A1   12/2004   Watanabe et al.
2012/0156546 A1*   6/2012   Amano ............... C08G 59/4014
                                                                429/149

FOREIGN PATENT DOCUMENTS

JP       09237639 A    9/1997
JP       11-171910 A   6/1999
(Continued)

OTHER PUBLICATIONS

Communication dated Jul. 31, 2018, from the Japanese Patent Office in counterpart application No. 2017-018947.

*Primary Examiner* — Jacob B Marks
(74) *Attorney, Agent, or Firm* — Sughrue Mion, PLLC

(57) ABSTRACT

A manufacturing method for an all-solid-state battery includes: producing a laminated battery having both end surfaces in a lamination direction and a side surface by laminating pluralities of collector layers, positive electrode mixture layers, solid electrolyte layers, and negative electrode mixture layers; supplying a liquid resin to only the side surface of the laminated battery; and curing the liquid resin. Producing the laminated battery by protruding at least one layer of the collector layer, the positive electrode mixture layer, the solid electrolyte layer, and the negative electrode mixture layer relative to remaining of the layers to form a protruding layer. Protruding a plurality of protruding layers from the side surface of the battery. Supplying the resin involves supplying the liquid resin to only the side surface of the laminated battery such that the liquid resin penetrates into a clearance between one protruding layer and another protruding layer.

17 Claims, 11 Drawing Sheets

(51) Int. Cl.
  *B32B 38/00* (2006.01)
  *H01M 2/02* (2006.01)
  *H01M 2/30* (2006.01)
  *B32B 37/10* (2006.01)
  *H01M 10/0525* (2010.01)

(52) U.S. Cl.
  CPC ......... *H01M 2/024* (2013.01); *H01M 2/0262* (2013.01); *H01M 2/305* (2013.01); *H01M 10/0525* (2013.01); *B32B 2038/0076* (2013.01); *B32B 2305/72* (2013.01); *B32B 2307/202* (2013.01); *B32B 2307/206* (2013.01); *B32B 2457/10* (2013.01); *H01M 2220/20* (2013.01)

(56) References Cited

FOREIGN PATENT DOCUMENTS

| | | |
|---|---|---|
| JP | 2000-106154 A | 4/2000 |
| JP | 2000-251858 A | 9/2000 |
| JP | 2003249265 A | 9/2003 |
| JP | 2005005163 A | 1/2005 |
| JP | 2008-113045 A | 5/2008 |
| JP | 2008-243657 A | 10/2008 |
| JP | 2011-061093 A | 3/2011 |
| JP | 2012-48853 A | 3/2012 |
| JP | 2012-138315 A | 7/2012 |
| JP | 2015-018769 A | 1/2015 |
| WO | 2014007215 A1 | 1/2014 |

\* cited by examiner

MANUFACTURING METHOD FOR ALL-SOLID-STATE BATTERY, MANUFACTURING APPARATUS FOR ALL-SOLID-STATE BATTERY, AND ALL-SOLID-STATE BATTERY

INCORPORATION BY REFERENCE

The disclosure of Japanese Patent Application No. 2016-110448 filed on Jun. 1, 2016 and Japanese Patent Application No. 2017-018947 filed on Feb. 3, 2017, each including the specification, drawings and abstract, is incorporated herein by reference in its entirety.

BACKGROUND

1. Technical Field

The present application discloses a manufacturing method for an all-solid-state battery, a manufacturing apparatus for an all-solid-state battery, and an all-solid-state battery.

2. Description of Related Art

A technique of coating a laminated battery, which is formed by laminating pluralities of positive electrode layers, solid electrolyte layers, and negative electrode layers, entirely with a resin is known (see Japanese Patent Application Publication No. 2000-251858). Thus coated, the battery is improved, for example, in resistance to moisture permeation and mechanical strength.

A conceivable method of coating the entire laminated battery with a resin is to coat the laminated battery with an uncured resin and then cure this uncured resin. Here, as disclosed in JP 2000-251858 A, a dipping method in which a laminated battery is immersed in an uncured resin and then pulled up, and a casting method in which a laminated battery is disposed inside a mold of a predetermined size and an uncured resin is poured into this mold are common methods of coating a laminated battery with an uncured resin.

Alternatively, a technique is also known in which a resin coating layer is formed by insert molding on an all-solid-state battery element that is formed by laminating a positive electrode layer, a solid electrolyte layer, and a negative electrode layer (see Japanese Patent Application Publication No. 2015-018769).

On the other hand, in the field of semiconductor manufacturing, which is a technical field completely different from that of all-solid-state batteries, a technique of packing an underfill resin into a clearance between a substrate and a chip is known (see Japanese Patent Application Publication No. 2008-113045 and Japanese Patent Application Publication No. 2011-061093).

SUMMARY

In a typical laminated battery, one layer or two layers of the positive electrode layer, the solid electrolyte layer, and the negative electrode layer are protruded relative to the other layers to form protruding layers, so that a plurality of protruding layers protrude from the side surface of the laminated battery. Here, a clearance between one protruding layer and another protruding layer in the side surface of the laminated battery is narrow. To coat the laminated battery with a resin by the dipping method or the casting method as disclosed in JP 2000-251858 A, therefore, it will be necessary to increase the amount of resin as much as possible, considering that the resin does not easily penetrate into this clearance in the side surface of the laminated battery. As a result, the volume of the laminated battery increases in the lamination direction, so that the energy density of the battery decreases.

The present application provides a manufacturing method for an all-solid-state battery and a manufacturing apparatus for an all-solid-state battery that can enhance the energy density of an all-solid-state battery, and further provides an all-solid-state battery with enhanced energy density.

A manufacturing method for an all-solid-state battery according to a first aspect of the present disclosure includes: producing a laminated battery having both end surfaces in a lamination direction and a side surface by laminating pluralities of collector layers, positive electrode mixture layers, solid electrolyte layers, and negative electrode mixture layers; supplying a liquid resin to only the side surface of the laminated battery; and curing the liquid resin. Producing the laminated battery includes protruding at least one layer of the collector layer, the positive electrode mixture layer, the solid electrolyte layer, and the negative electrode mixture layer relative to remaining of the collector layer, the positive electrode mixture layer, the solid electrolyte layer, and the negative electrode mixture layer to form a protruding layer, and protruding a plurality of protruding layers from the side surface of the laminated battery. Supplying the liquid resin includes supplying the liquid resin to only the side surface of the laminated battery such that the liquid resin penetrates into a clearance between one protruding layer and another protruding layer.

The "collector layer" is a layer that functions as a positive electrode collector or a negative electrode collector. One collector layer may function as both a positive electrode collector and a negative electrode collector. "Laminating pluralities of collector layers, positive electrode mixture layers, solid electrolyte layers, and negative electrode mixture layers" means, for example, laminating the collector layer, the positive electrode mixture layer, the solid electrolyte layer, and the negative electrode mixture layer repeatedly in this order so as to reach a state where a plurality of battery elements are laminated. Thus, the "laminated battery" is composed of a plurality of battery elements. The collector layer and the positive electrode mixture layer, and the collector layer and the negative electrode mixture layer may be joined together one on top of the other, for example, by applying a mixture slurry to a surface of the collector, and this step may be performed before the laminated battery is produced. "Both end surfaces in the lamination direction" refer to surfaces constituting outermost sides in the lamination direction of the laminated battery. The "side surface" is a surface formed by outer edges of the positive electrode mixture layer, the solid electrolyte layer, and the negative electrode mixture layer. The "liquid resin" refers to an uncured resin, which may be any resin that can be cured later by some treatment. The "liquid" does not necessarily mean that the resin is in a liquid state at room temperature, and the liquid resin may be a resin melted by heating. Accordingly, in the present application, the "liquid resin" includes not only hardening resins such as thermosetting resins and photo-setting resins, but also thermoplastic resins. "Supplying a liquid resin to only the side surface" means supplying a liquid resin to the side surface of the laminated battery while leaving a large part of both end surfaces in the lamination direction of the laminated battery exposed without being coated with a liquid resin. "Protruding at least one layer of the collector layer, the positive electrode mixture layer, the solid electrolyte layer, and the negative electrode mixture layer relative to the other layers to form a protruding layer" means that the outer edges of at least one layer of the collector layer, the positive electrode mixture layer, the solid electrolyte layer, and the negative electrode mixture layer protrude outward relative to the outer edges of the other layers.

The manufacturing method of the first aspect may further include, after completion of supplying the liquid resin and before start of curing the liquid resin, raising an atmospheric pressure above an atmospheric pressure at which the liquid resin is supplied.

The "atmospheric pressure" refers to a pressure applied to the laminated battery.

The manufacturing method of the above aspect may further include, after completion of producing the laminated battery and before start of supplying the liquid resin, reducing an atmospheric pressure below an atmospheric pressure at which the laminated battery is produced. It is not necessary to produce the laminated battery and supply the liquid resin by the same apparatus.

The manufacturing method of the above aspect may further include, after completion of producing the laminated battery and before start of supplying the liquid resin, covering both end surfaces in the lamination direction of the laminated battery with a cover member, and supplying the liquid resin may include protecting both end surfaces in the lamination direction of the laminated battery from the liquid resin by the cover member.

In the manufacturing method of the above aspect, the resin may be supplied while the laminated battery is held by a jig. The jig may have a lower bottom surface covering one end surface in the lamination direction of the laminated battery, an upper cover member covering the other end surface in the lamination direction of the laminated battery, and a side surface tapered from the upper cover member toward the lower bottom surface.

In the manufacturing method of the above aspect, producing the laminated battery may include forming a bipolar electrode layer by the collector layer, the positive electrode mixture layer, and the negative electrode mixture layer. A plurality of bipolar electrode layers may be laminated with the solid electrolyte layers interposed therebetween to form the laminated battery. At least one layer of the collector layer, the positive electrode mixture layer, the solid electrolyte layer, and the negative electrode mixture layer may be protruded relative to remaining of the collector layer, the positive electrode mixture layer, the solid electrolyte layer, and the negative electrode mixture layer to form a protruding layer, and a plurality of protruding layers may be protruded from the side surface of the laminated battery.

A manufacturing apparatus for an all-solid-state battery according to a second aspect of the present disclosure is an apparatus that manufactures an all-solid-state battery by supplying a liquid resin to only a side surface of a laminated battery and then curing the liquid resin on the laminated battery. The laminated battery has both end surfaces in a lamination direction and the side surface and in which a plurality of protruding layers protrude from the side surface, with a clearance left between one protruding layer and another protruding layer. The manufacturing apparatus includes a chamber that houses the laminated battery, and a resin supply unit configured to supply a liquid resin to only the side surface of the laminated battery housed in the chamber.

As described above, the "laminated battery" is a battery formed by laminating pluralities of collector layers, positive electrode mixture layers, solid electrolyte layers, and negative electrode mixture layers. The "resin supply unit" may be any means that can supply a liquid resin to only the side surface of the laminated battery by discharging the liquid resin, for example. Various forms of the resin supply unit, including a pipe and a nozzle having a discharge opening, can be adopted.

The manufacturing apparatus of the second aspect may further include a pressure control unit configured to control a pressure inside the chamber. The pressure control unit may be configured to relatively raise the pressure inside the chamber after the liquid resin is supplied from the resin supply unit to only the side surface of the laminated battery and before the liquid resin is cured.

"The pressure control unit relatively raises the pressure inside the chamber after the liquid resin is supplied from the resin supply unit to only the side surface of the laminated battery and before the liquid resin is cured" may be a concept including a form in which, when the inside of the chamber has been depressurized "before the liquid resin is supplied from the resin supply unit to only the side surface of the laminated battery," the pressure inside the chamber is brought back to a barometric pressure (i.e., the chamber is opened so as to reach the barometric pressure). Thus, any means that relatively raises the pressure inside the chamber regardless of the pressure outside the chamber can serve as the pressure control unit of the manufacturing apparatus of the present disclosure.

The manufacturing apparatus of the second aspect may further include a pressure control unit that controls a pressure inside the chamber. The pressure control unit may be configured to relatively reduce the pressure inside the chamber after the laminated battery is housed in the chamber and before the liquid resin is supplied from the resin supply unit to only the side surface of the laminated battery.

The manufacturing apparatus of the second aspect may further include a jig configured to hold the laminated battery while protecting the end surfaces in the lamination direction of the laminated battery. The liquid resin may be supplied from the resin supply unit to only the side surface of the laminated battery in a state where the jig protects the end surfaces in the lamination direction of the laminated battery.

The manufacturing apparatus of the above aspect may further include a jig configured to hold the laminated battery while protecting the end surfaces in the lamination direction of the laminated battery. The jig may have a lower bottom surface covering one end surface in the lamination direction of the laminated battery, an upper cover member covering the other end surface in the lamination direction of the laminated battery, and a side surface tapered from the upper cover member toward the lower bottom surface.

The manufacturing apparatus of the above aspect may further include a heating unit that heats at least the side surface of the laminated battery.

The manufacturing apparatus of the above aspect may further include a cooling unit that cools at least the side surface of the laminated battery.

An all-solid-state battery according to a third aspect of the present disclosure includes: a laminated battery formed by laminating pluralities of collector layers, positive electrode mixture layers, solid electrolyte layers, and negative electrode mixture layers; outermost collector layers constituting both end surfaces in a lamination direction of the laminated battery; and a resin coating only a side surface of the laminated battery. At least one layer of the collector layer, the positive electrode mixture layer, the solid electrolyte layer, and the negative electrode mixture layer is protruded outward relative to remaining of the collector layer, the positive electrode mixture layer, the solid electrolyte layer, and the negative electrode mixture layer to form a protruding layer, and a plurality of protruding layers protrude from the side surface of the laminated battery. The resin has penetrated into a clearance between one protruding layer and another protruding layer. A battery case that seals the laminated battery except for the outermost collector layers is formed by the outermost collector layers and the resin, and the outermost collector layers serve as battery terminals.

"A battery case that seals the laminated battery except for the outermost collector layers is formed by the outermost collector layers and the resin" means, in other words, that a part of the laminated battery except for the outermost collector layers is housed in a space defined by the outermost collector layers and the resin and held by the outermost collector layers and the resin so that moisture etc. does not penetrate into the laminated battery. The all-solid-state battery of the present disclosure, of which "the outermost collector layers serve as battery terminals," has both end surfaces in the lamination direction of the laminated battery exposed without being coated with a resin.

In the all-solid-state battery of the third aspect, the collector layer, the positive electrode mixture layer, and the negative electrode mixture layer may constitute a bipolar electrode layer. The laminated battery may be formed by laminating a plurality of bipolar electrode layers with the solid electrolyte layers interposed therebetween. At least one layer of the collector layer, the positive electrode mixture layer, the solid electrolyte layer, and the negative electrode mixture layer may be protruded outward relative to remaining of the collector layer, the positive electrode mixture layer, the solid electrolyte layer, and the negative electrode mixture layer to form a protruding layer, and a plurality of protruding layers may protrude from the side surface of the laminated battery.

According to the manufacturing method for an all-solid-state battery, the manufacturing apparatus for an all-solid-state battery, and the all-solid-state battery of the present disclosure, a resin is supplied to only the side surface of the laminated battery so as to allow the resin to efficiently penetrate into the clearances in the side surface of the laminated battery. In the manufacturing method etc. of the present disclosure, no resin is supplied in the lamination direction of the laminated battery, so that the energy density of the all-solid-state battery can be enhanced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

1. Manufacturing Method for All-Solid-State Battery

Figure 1:
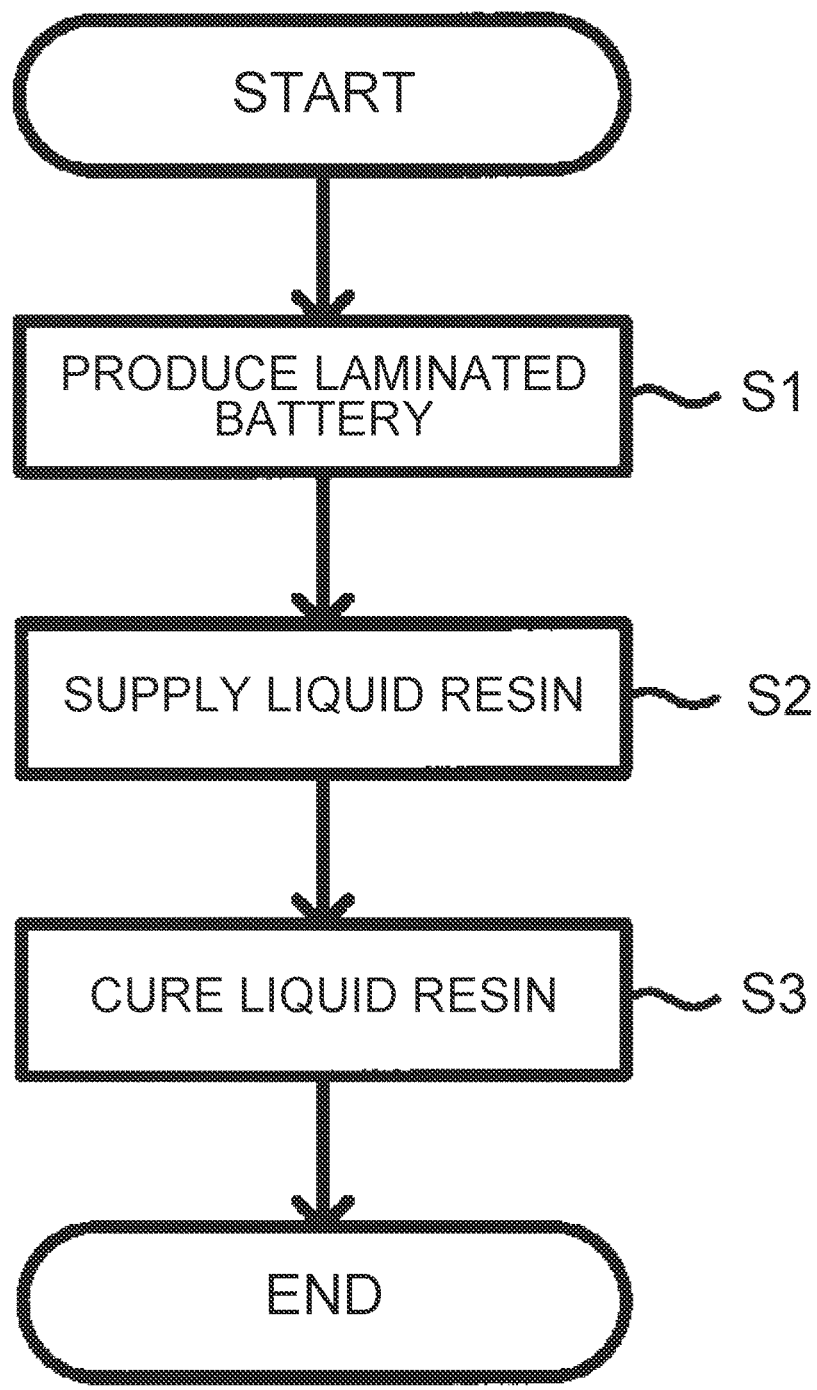
FIG. 1 is a view illustrating the flow of a manufacturing method for an all-solid-state battery.

A manufacturing method for an all-solid-state battery 10 will be described with reference to FIGS. 1 to 5. As shown in FIG. 1, the manufacturing method for the all-solid-state battery 10 includes: a first step (S1) of producing a laminated battery 6 having both end surfaces in a lamination direction and a side surface by laminating pluralities of collector layers 1, positive electrode mixture layers 2, solid electrolyte layers 5, and negative electrode mixture layers 3; a second step (S2) of supplying a liquid resin 7' to only the side surface of the laminated battery 6; and a third step (S3) of curing the liquid resin 7'. Here, as shown in FIGS. 2A, 2B, 3A, and 3B, in the first step (S1), at least one layer of the collector layer 1, the positive electrode mixture layer 2, the solid electrolyte layer 5, and the negative electrode mixture layer 3 is protruded relative to the other layers to form a protruding layer, and a plurality of protruding layers are protruded from the side surface of the laminated battery 6. As shown in FIGS. 4A, 4B, and 4C, in the second step (S2), the liquid resin 7' is supplied to only the side surface of the laminated battery 6 so that the liquid resin 7' penetrates into a clearance X between one protruding layer and another protruding layer.

1.1. First Step

The first step S1 is a step of producing the laminated battery 6 having both end surfaces in the lamination direction and the side surface by laminating the pluralities of collector layers 1, positive electrode mixture layers 2, solid electrolyte layers 5, and negative electrode mixture layers 3. As shown in FIGS. 2A, 2B, 3A, and 3B, in step S1, at least one layer of the collector layer 1, the positive electrode mixture layer 2, the solid electrolyte layer 5, and the negative electrode mixture layer 3 is protruded relative to the other layers to form a protruding layer, and a plurality of protruding layers are protruded from the side surface of the laminated battery 6.

1.1.1. Collector Layer

Any publicly-known collector of an all-solid-state battery can be adopted as the collector layer 1. For example, the collector layer 1 can be formed by a metal foil, a metal mesh, etc. A metal foil is particularly preferable. The area and the thickness of a lamination surface of the collector layer 1 are not particularly limited. Examples of a metal forming the collector layer 1 include Cu, Ni, Al, Fe, and Ti.

Figure 2A:
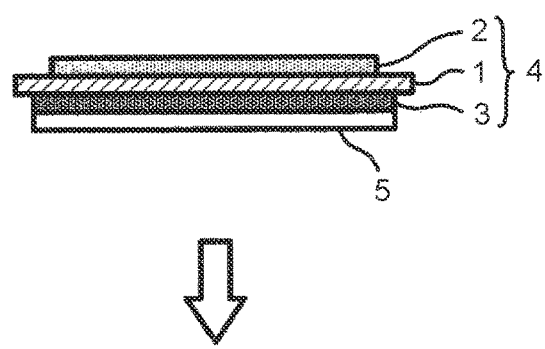
FIG. 2A is a schematic sectional view illustrating a first step (S1)

As shown in FIG. 2A, it is preferable that the positive electrode mixture layer 2, the collector layer 1, and the negative electrode mixture layer 3 constitute a bipolar electrode layer 4. If the bipolar electrode layer 4 is adopted, the volume of the laminated battery 6 in the lamination direction can be reduced, and thus the all-solid-state battery 10 with higher energy density can be manufactured. In the case where the bipolar electrode layer 4 is formed, the battery elements are connected in series inside the laminated battery 6, and electricity can be taken out from collector layers (outermost collector layers) constituting both end surfaces in the lamination direction of the laminated battery 6. In the case where the collector layer 1, the positive electrode mixture layer 2, and the negative electrode mixture layer 3 do not constitute a bipolar electrode layer, the cells are connected in parallel inside the laminated battery 6. In other words, it is necessary to connect with a lead wire etc. a plurality of positive electrode collector layers of the laminated battery 6 to one another and a plurality of negative electrode collector layers of the laminated battery 6 to one another. In this case, ends of the lead wire can be formed by the outermost collector layers so that electricity can be taken out from the outermost collector layers. In this case, the lead wire etc. may be exposed in the side surface of the laminated battery 6 before the resin is supplied (before step S2 to be described later). In this case, it is possible to seal the side surface of the laminated battery 6 including this lead wire by supplying the resin to only the side surface in step S2 to be described later.

Here, as will be described later, in the case where the outermost collector layers serve as battery terminals, it is preferable that the outermost collector layers be formed by layers having a larger thickness and higher mechanical strength than the collector layers inside the laminated battery 6. Specifically, the thickness of the outermost collector layer is preferably not smaller than 15 µm and not larger than 200 µm.

1.1.2. Positive Electrode Mixture Layer

Figure 2B:
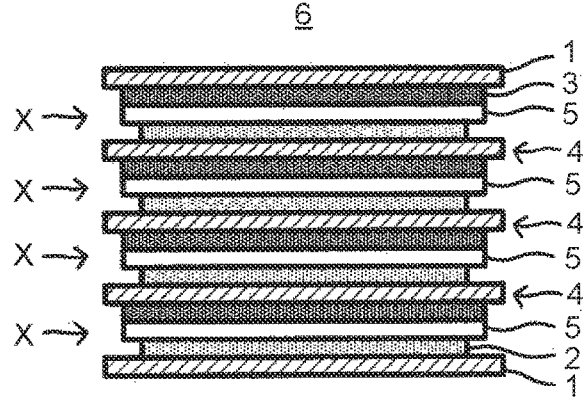
FIG. 2B is a schematic sectional view illustrating the first step (S1)

Any publicly-known positive electrode mixture layer of an all-solid-state battery can be adopted as the positive electrode mixture layer 2. In FIGS. 2A and 2B, the positive electrode mixture layer 2 is laminated on one side of the collector layer 1.

The positive electrode mixture layer 2 includes at least a positive electrode active material, and optionally further includes a solid electrolyte, a binder, and a conductivity aid. A publicly-known active material can be used as the positive electrode active material. It is possible to select from publicly-known active materials two materials that have different electric potentials for absorbing and releasing a predetermined ion (charging and discharging electric potentials), and to use one material having an electropositive potential as the positive electrode active material, and use the other material having an electronegative potential as a negative electrode active material to be described later. For example, to form an all-solid-state lithium ion battery, a lithium compound such as $LiNi_{1/3}Co_{1/3}Mn_{1/3}O_2$ can be used as the positive electrode active material. A surface of the positive electrode active material may be coated with an oxide layer such as a lithium niobate layer. The solid electrolyte is preferably an inorganic solid electrolyte. This is because an inorganic solid electrolyte has higher ionic conductivity than an organic polymer electrolyte. Moreover, an inorganic solid electrolyte is superior in heat resistance to an organic polymer electrolyte. Examples of an inorganic solid electrolyte include an oxide solid electrolyte such as $Li_3PO_4$ and a sulfide solid electrolyte such as $Li_2S—P_2S_5$. In particular, a sulfide solid electrolyte containing $Li_2S—P_2S_5$ is preferable, and a sulfide solid electrolyte containing 50 mol % or more of $Li_2S—P_2S_5$ is more preferable. As the conductivity aid, carbon materials such as acetylene black and Ketjenblack, and metal materials such as nickel, aluminum, and stainless steel can be used. As the binder, various binders such as butadiene rubber (BR), acrylate-butadiene rubber (ABR), and polyvinylidene difluoride (PVdF) can be used. The content of each component in the positive electrode mixture layer 2 may be the same as in a conventional one. The positive electrode mixture layer 2 may have any sheet shape. For example, the thickness of the positive electrode mixture layer 2 is preferably not smaller than 0.1 µm and not larger than 1 mm, and more preferably not smaller than 1 µm and not larger than 100 µm.

1.1.3. Solid Electrolyte Layer

The solid electrolyte layer 5 includes a solid electrolyte and optionally a binder. The solid electrolyte is preferably the inorganic solid electrolyte mentioned above. As the binder, a binder similar to the one used for the positive electrode mixture layer 2 can be appropriately selected and used. The content of each component in the solid electrolyte layer 5 may be the same as in a conventional one. The solid electrolyte layer 5 can have any sheet shape. For example, the thickness of the solid electrolyte layer 5 is preferably not smaller than 0.1 µm and not larger than 1 mm, and more preferably not smaller than 1 µm and not larger than 100 µm.

1.1.4. Negative Electrode Mixture Layer

Any publicly-known negative electrode mixture layer of an all-solid-state battery can be adopted as the negative electrode mixture layer 3. In FIGS. 2A and 2B, the negative electrode mixture layer 3 is laminated on the other side of the collector layer 1.

The negative electrode mixture layer 3 includes at least a negative electrode active material, and optionally further includes a solid electrolyte, a binder, and a conductivity aid. A publicly-known active material can be used as the negative electrode active material. It is possible to select from publicly-known active materials two materials that have different electric potentials for absorbing and releasing a predetermined ion (charging and discharging electric potentials), and to use one material having an electropositive potential as the above-described positive electrode active material, and use the other material having an electronegative potential as the negative electrode active material. For example, to form an all-solid-state lithium ion battery, a carbon material such as graphite, various oxides, a metal lithium, or a lithium alloy can be used as the negative electrode active material. A solid electrolyte, a binder, and a conductivity aid similar to those used for the positive electrode mixture layer 2 can be appropriately selected and used for the negative electrode mixture layer 3. The content of each component in the negative electrode mixture layer 3 may be the same as in a conventional one. The negative electrode mixture layer 3 may have any sheet shape. For example, the thickness of the negative electrode mixture layer 3 is preferably not smaller than 0.1 µm and not larger than 1 mm, and more preferably not smaller than 1 µm and not larger than 100 µm. However, it is preferable that the thickness of the negative electrode mixture layer 3 be determined so that the capacity of the negative electrode becomes larger than the capacity of the positive electrode.

1.1.5. Laminated Battery

As shown in FIG. 2B, the laminated battery 6 is formed by laminating the pluralities of collector layers 1, positive electrode mixture layers 2, solid electrolyte layers 5, and negative electrode mixture layers 3. Specifically, the collector layer 1, the positive electrode mixture layer 2, the solid electrolyte layer 5, and the negative electrode mixture layer 3 are laminated repeatedly in this order so as to reach a state where a plurality of battery elements are laminated. Here, in the laminated battery 6, at least one layer of the collector layer 1, the positive electrode mixture layer 2, the solid electrolyte layer 5, and the negative electrode mixture layer 3 is protruded relative to the other layers to form a protruding layer, and a plurality of protruding layers protrude from the side surface of the laminated battery 6 as shown in FIGS. 2A, 2B, 3A, and 3B.

The layer that is formed as the protruding layer in the laminated battery 6 is not particularly limited. In particular, it is preferable that the collector layer 1 be protruded outward relative to the other layers as the protruding layer. Alternatively, it is preferable that the solid electrolyte layer 5 be protruded outward relative to the other layers as the protruding layer. On the other hand, it is preferable that the positive electrode mixture layer 2 be recessed inward relative to the other layers.

Figure 3A:
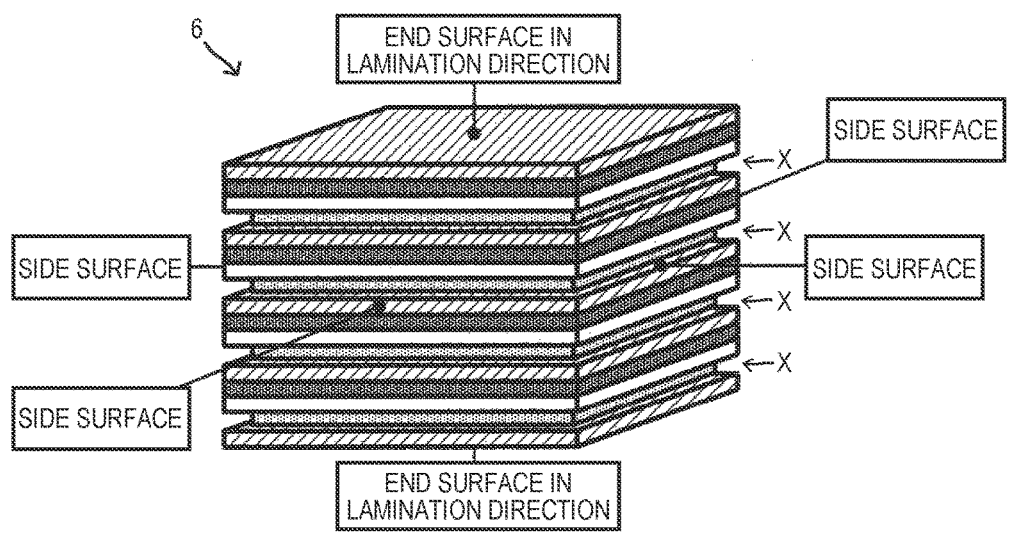
FIG. 3A is a schematic sectional view illustrating the form of a side surface of a laminated battery 6.
Figure 3B:
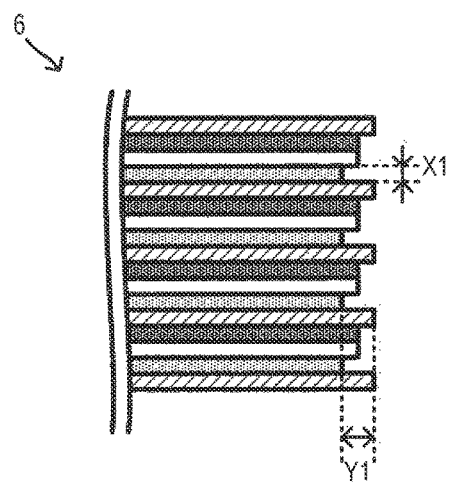
FIG. 3B is a schematic sectional view illustrating the form of the side surface of the laminated battery 6.
Figure 4A:
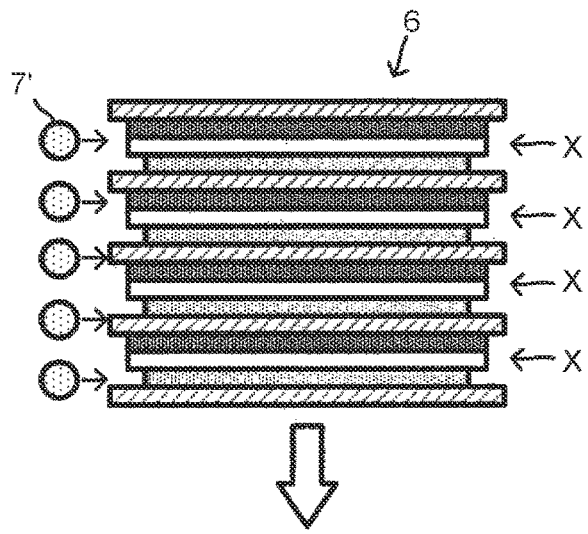
FIG. 4A is a schematic sectional view illustrating a second step (S2)
Figure 4B:
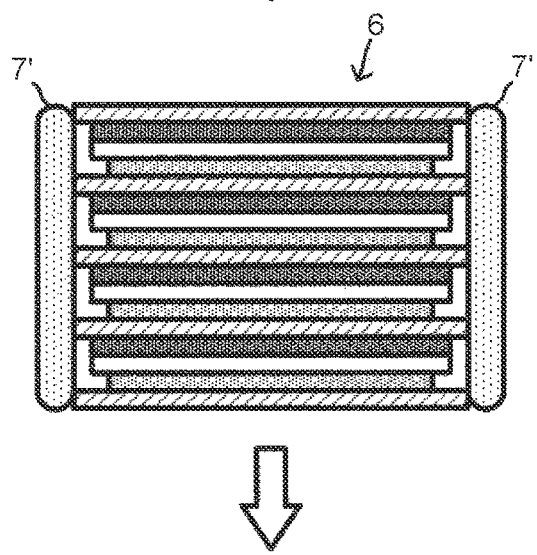
FIG. 4B is a schematic sectional view illustrating the second step (S2)
Figure 4C:
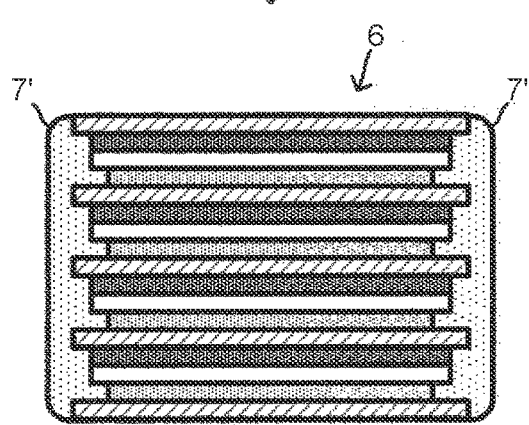
FIG. 4C is a schematic sectional view illustrating the second step (S2)

As shown in FIG. 3A, those collector layers 1 that are located on the outermost sides constitute both end surfaces in the lamination direction of the laminated battery 6. The side surface of the laminated battery 6 is formed as outer edges of the layers are laid one on top of another. As described above, the plurality of protruding layers protrude from the side surface of the laminated battery 6, and a plurality of clearances X are formed. The form of the clearance X is determined by the protrusion length of the protruding layer and the thickness of each layer. The specific width of the clearance (interval between the protruding layers) or depth of the clearance (protrusion length of the protruding layer) in the side surface of the laminated battery 6 may be as follows. For example, the lower limit of the width of the minimum clearance between one protruding layer and another protruding layer (length X1 in FIG. 3B) is preferably not smaller than 0.1 μm and more preferably not smaller than 1 μm, and the upper limit thereof is preferably not larger than 1 mm and more preferably not larger than 100 μm. In the laminated battery 6, the lower limit of the maximum protrusion length of the protruding layer (length Y1 in FIG. 3B) is preferably not smaller than 0.5 mm and more preferably not smaller than 1 mm, and the upper limit thereof is preferably not larger than 5 mm and more preferably not larger than 3 mm. As shown in FIG. 3B, the clearance formed in the side surface of the laminated battery 6 may have a multistep structure.

1.2. Second Step

The second step S2 is a step of supplying the liquid resin 7' to only the side surface of the laminated battery 6. As shown in FIGS. 4A, 4B, and 4C, in step S2, the liquid resin 7' is supplied to only the side surface of the laminated battery 6 (FIGS. 4A and 4B) so that the liquid resin 7' penetrates into the clearance X between one protruding layer and another protruding layer (FIG. 4C).

1.2.1. Liquid Resin

The type of the liquid resin 7' is not particularly limited. Various resins such as thermosetting resins, ultraviolet ray hardening resins, and thermoplastic resins can be adopted. A thermosetting resin is particularly preferable. It is preferable that the viscosity of the liquid resin 7' when the liquid resin 7' is supplied to the laminated battery 6 be not lower than 3000 mPa·s and not higher than 3500 mPa·s at 25° C. If the liquid resin 7' has such viscosity, the liquid resin 7' can easily penetrate into the clearances in the side surface of the laminated battery 6 by a capillary action. As a specific example of the liquid resin 7', a resin similar to an underfill resin used in the field of semiconductor manufacturing is preferably used. That is, an epoxy resin etc. can be used. Alternatively, an amine resin etc. can also be used.

The rate of supply and the amount of supply of the liquid resin 7' in the second step S2 can be adjusted appropriately according to the form of the clearance in the side surface of the laminated battery 6, and such an amount of resin that the side surface of the laminated battery 6 can be sufficiently sealed should be supplied. In step S2, the liquid resin 7' is supplied to the side surface of the laminated battery 6 while a large part of both end surfaces in the lamination direction (surfaces of the collector layers 1) of the laminated battery 6 is left exposed without being coated with the liquid resin 7'. In this way, the resin is allowed to efficiently penetrate into the clearances in the side surface of the laminated battery 6, and at the same time an increase in volume of the battery in the lamination direction can be suppressed.

1.3. Third Step

Figure 5A:
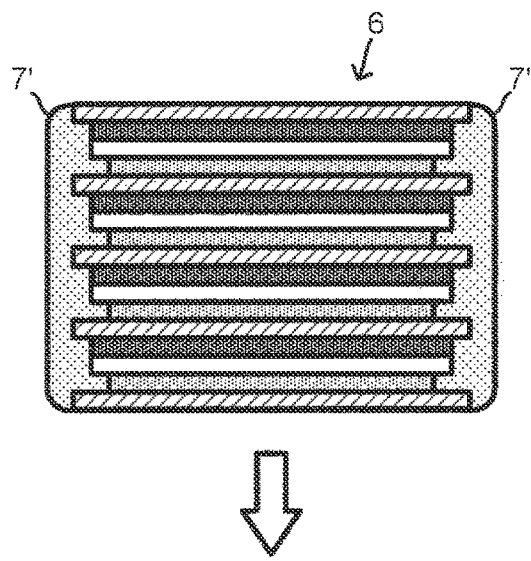
FIG. 5A is a schematic view illustrating a third step (S3)
Figure 5A:
Figure 5B:
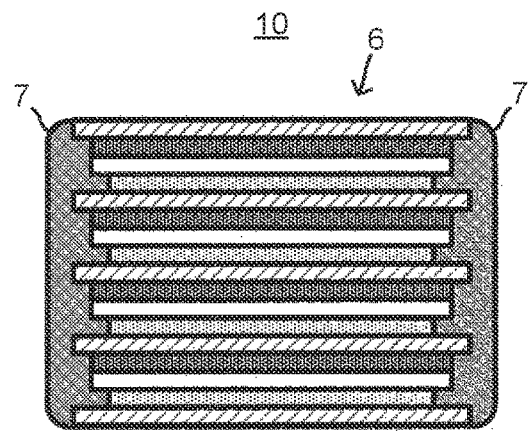
FIG. 5B is a schematic view illustrating the third step (S3)

The third step S3 is a step of curing the liquid resin 7'. As shown in FIGS. 5A and 5B, as the liquid resin 7' cures gradually on the side surface of the laminated battery 6 (FIG. 5A), a cured resin layer 7 is provided on the side surface of the laminated battery 6, and thus the all-solid-state battery 10 is produced (FIG. 5B).

The method of curing the liquid resin 7' differs among types of resins. For example, if a thermosetting resin is used as the liquid resin 7', the liquid resin 7' can be cured by heating at least the side surface of the laminated battery 6 after step S2. If an ultraviolet ray hardening resin is used, the liquid resin 7' can be cured by irradiating at least the side surface of the laminated battery 6 with an ultraviolet ray after step S2. If a thermoplastic resin is used, the liquid resin 7' can be cured by cooling (including natural cooling) at least the side surface of the laminated battery 6 after step S2.

It is preferable that the second step S2 and the third step S3 be performed in a low dew-point atmosphere. Specifically, the second step S2 and the third step S3 are performed in a low dew-point atmosphere, preferably with the dew point of not higher than −30° C., and more preferably with the dew point of not higher than −50° C. As will be described later, steps S2 and S3 can be performed in a low dew-point atmosphere by controlling an atmospheric pressure or creating a dry air atmosphere.

1.4. Other Steps

As has been described above, the manufacturing method of the present disclosure essentially includes the first step S1, the second step S2, and the third step S3. Here, the first step S1 to the third step S3 can be performed in an atmosphere under a barometric pressure. However, controlling the atmospheric pressure can allow the liquid resin 7' to more efficiently penetrate into the clearances in the side surface of the laminated battery 6.

1.4.1. Pressurization Step

Figure 6:
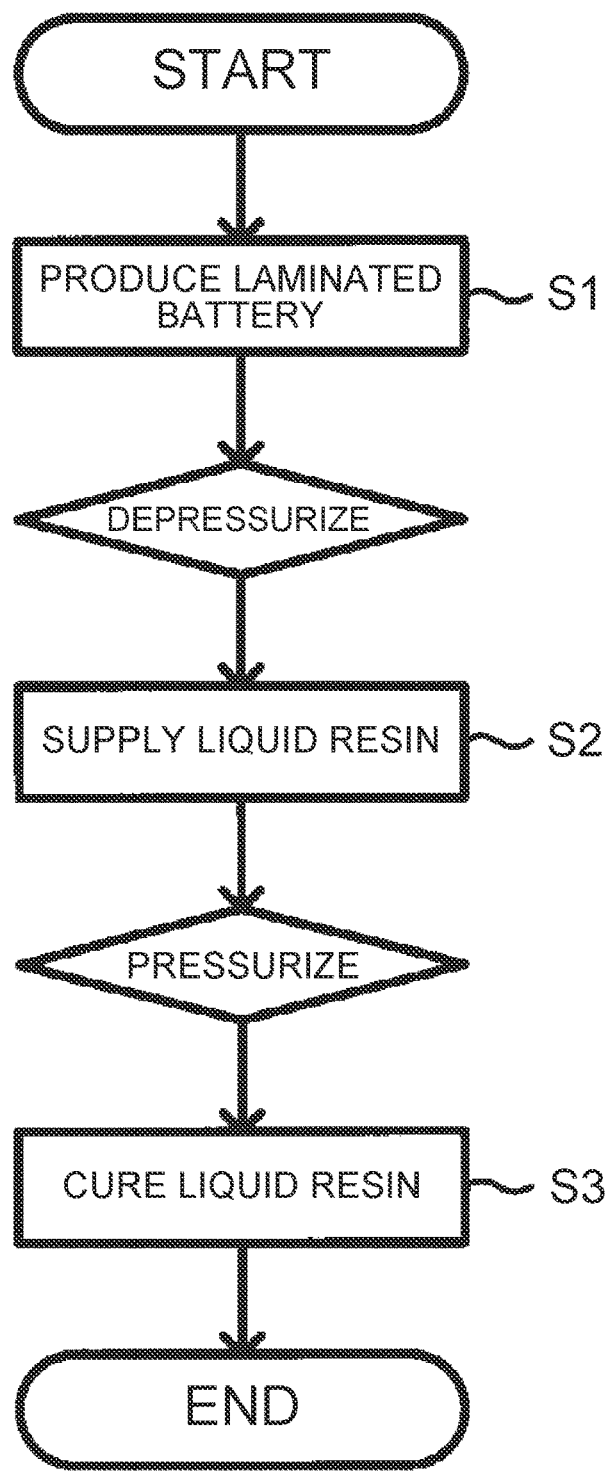
FIG. 6 is a view illustrating pressurization step and depressurization step which is other than steps S1 to S3 of FIG. 1.

As shown in FIG. 6, it is preferable that the manufacturing method for an all-solid-state battery include, after completion of the second step S2 and before start of the third step S3, a pressurization step of raising the atmospheric pressure above an atmospheric pressure at which the second step S2 is performed. Thus, penetration of the liquid resin 7' into the clearances in the side surface of the laminated battery 6 can be promoted. As will be described later, in the case where a depressurization step is performed after completion of the first step S1 and before start of the second step S2, the atmospheric pressure can be raised above the atmospheric pressure at which the second step S2 is performed, by releasing the atmospheric pressure so as to reach the barometric pressure after completion of the second step S2 and before start of the third step S3. Thus, in the manufacturing method of the present disclosure, the "pressurization step" does not necessarily require the atmospheric pressure to be raised above the barometric pressure.

1.4.2. Depressurization Step

As shown in FIG. 6, it is preferable that the manufacturing method for an all-solid-state battery include, after completion of the first step S1 and before start of the second step S2, a depressurization step of reducing the atmospheric pressure below an atmospheric pressure at which the first step S1 is performed. Thus, air etc. present inside the clearances in the side surface of the laminated battery 6 and moisture etc. present inside the laminated battery 6 can be removed before the liquid resin 7' is supplied, so that, when the liquid resin 7' is supplied to the side surface of the laminated battery 6, this resin can easily penetrate into the clearances and generation of voids can be prevented. The degree of depressurization in the depressurization step is not particularly limited. For example, the atmospheric pressure is reduced preferably to 1000 Pa or lower, more preferably to 500 Pa or lower, and even more preferably to 130 Pa or lower.

As has been described above, in the manufacturing method for an all-solid-state battery, it is possible to allow the liquid resin 7' to more efficiently penetrate into the clearances in the side surface of the laminated battery 6 by controlling the atmospheric pressure. Means for controlling the atmospheric pressure is not particularly limited. For example, the atmospheric pressure can be controlled to a desired pressure by evacuating the inside of the chamber, or opening the chamber so as to reach the barometric pressure, after installing the laminated battery 6 inside the chamber.

1.4.3. Covering Step

Figure 7:
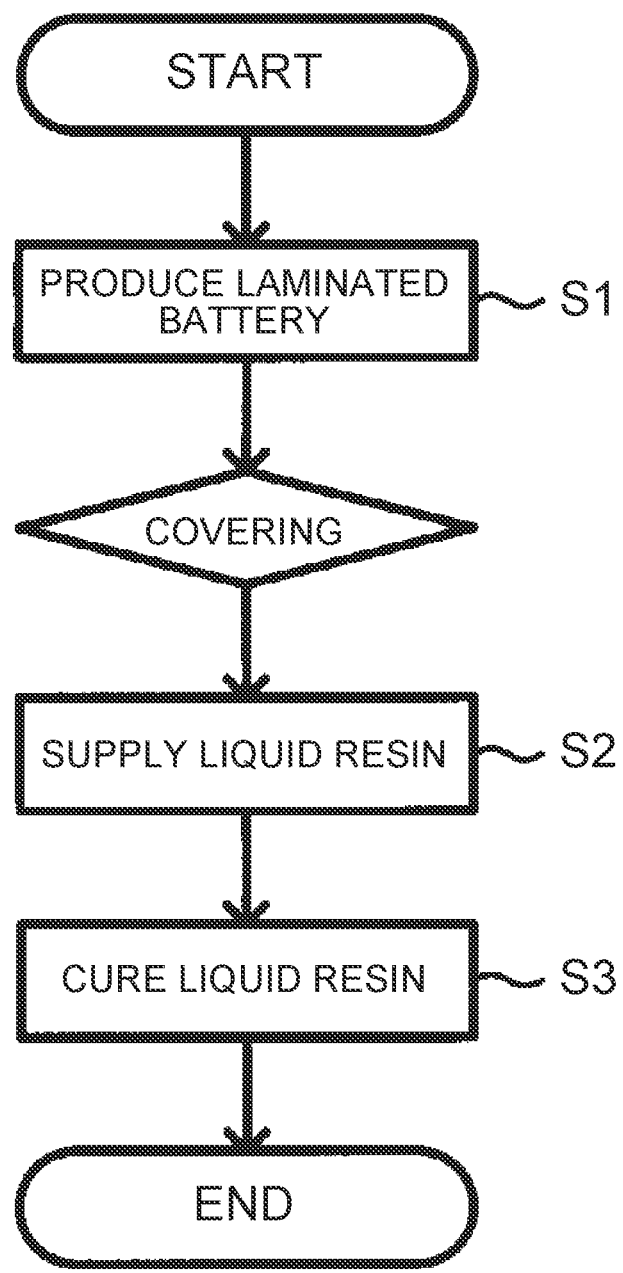
FIG. 7 is a view illustrating a covering step, which is other than steps S1 to S3 of FIG. 1.

As shown in FIG. 7, it is preferable that the manufacturing method for an all-solid-state battery include a step of covering both end surfaces in the lamination direction of the laminated battery 6 with a cover member after completion of the first step S1 and before start of the second step S2. Covering means is not particularly limited. For example, both end surfaces in the lamination direction of the laminated battery 6 can be covered with jigs that hold the laminated battery 6 from both ends in the lamination direction. Alternatively, a masking tape may be attached to both end surfaces in the lamination direction of the laminated battery 6. However, using the jigs as the cover member is preferable from the viewpoint of offering high production efficiency and being repeatedly usable.

If the manufacturing method for an all-solid-state battery includes this covering step after completion of the first step S1 and before start of the second step S2, both end surfaces in the lamination direction of the laminated battery 6 can be protected from the liquid resin 7' by the cover member in the second step S2. Thus, the liquid resin 7' can be prevented from adhering to both end surfaces in the lamination direction of the laminated battery 6, and an increase in volume of the laminated battery 6 in the lamination direction can be easily suppressed.

The covering step is preferably performed in a dry air environment. Thus, the laminated battery 6 can be prevented from deteriorating by absorbing moisture.

As has been described above, other steps than the first step S1, the second step S2, and the third step S3 can be appropriately added to the manufacturing method for an all-solid-state battery. In this manufacturing method, only one step or two or more steps of the above-described pressurization step, depressurization step, and covering step may be adopted.

2. Manufacturing Apparatus for All-Solid-State Battery

Figure 8:
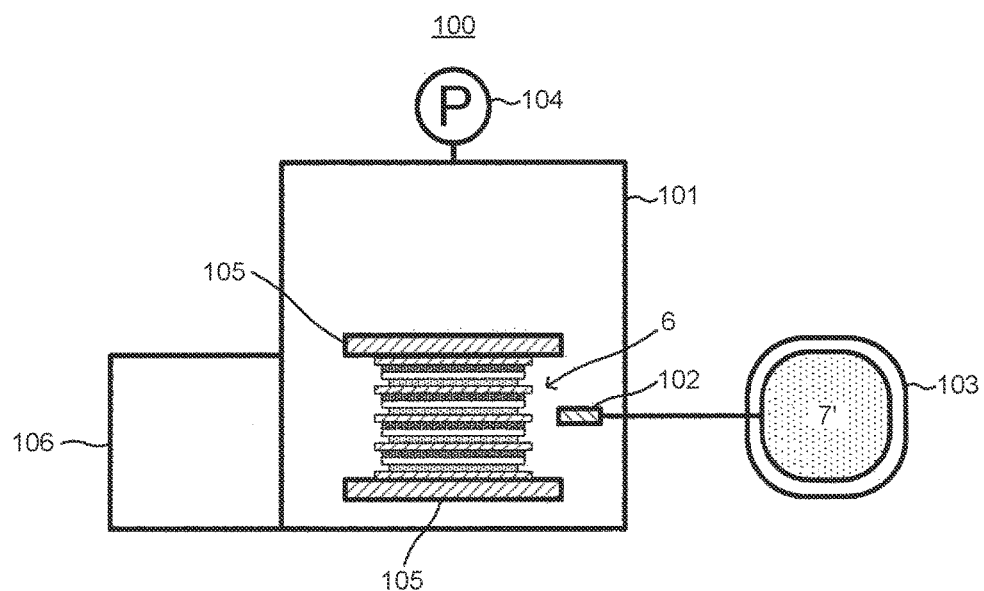
FIG. 8 is a schematic view illustrating a manufacturing apparatus for an all-solid-state battery.

FIG. 8 schematically shows a manufacturing apparatus 100 of an all-solid-state battery that can implement the manufacturing method. The manufacturing apparatus 100 is an apparatus that manufactures an all-solid-state battery by supplying a liquid resin to and then curing the liquid resin on only the side surface of the laminated battery 6 which has both end surfaces in the lamination direction and the side surface and in which the plurality of protruding layers protrude from the side surface, with the clearance left between one protruding layer and another protruding layer. As shown in FIG. 8, the manufacturing apparatus 100 includes a chamber 101 that houses the laminated battery 6, and a resin supply unit 102 that supplies the liquid resin 7' to only the side surface of the laminated battery 6 housed in the chamber 101.

2.1. Chamber

The chamber 101 may be any chamber that can house the laminated battery 6, but is preferably a hermetically-closable chamber so that the internal pressure can be controlled. As a publicly-known chamber can be adopted as the chamber itself, description thereof will be omitted here.

2.2. Resin Supply Unit

The resin supply unit 102 is configured to supply the liquid resin 7' to only the side surface of the laminated battery 6 housed in the chamber 101. For example, as shown in FIG. 8, in a state where the laminated battery 6 is installed inside the chamber 101, a dispenser nozzle 102 installed in the vicinity of the side surface of the laminated battery 6 can serve as the resin supply unit. Specifically, the dispenser nozzle 102 is connected to a resin supply source 103 provided outside the chamber 101, and the liquid resin 7' supplied from the resin supply source 103 to the dispenser nozzle 102 through a pipe is discharged from a tip of the dispenser nozzle 102, and thus the liquid resin 7' can be supplied to only the side surface of the laminated battery 6.

Only one or a plurality of resin supply units 102 may be provided inside the chamber 101. It is preferable that the resin supply unit 102 be movable around the side surface of the laminated battery 6. In other words, it is preferable that the installation position of the resin supply unit 102 inside the chamber 101 be changeable in the manufacturing apparatus 100. Alternatively, in the manufacturing apparatus 100, it is preferable that the laminated battery 6 be rotatable (jigs 105 fixing the laminated battery 6 be rotatable), with the resin supply unit 102 fixed in the vicinity of the side surface of the laminated battery 6 inside the chamber 101, so that the resin supply unit 102 is relatively movable around the side surface of the laminated battery 6.

2.3. Other Constituent Parts

As has been described above, the manufacturing apparatus 100 essentially includes the chamber 101 and the resin supply unit 102. It is preferable that the manufacturing apparatus 100 further include the following pressure control unit in addition to the chamber 101 and the resin supply unit 102. That is, while an all-solid-state battery can be manufactured in an atmosphere under a barometric pressure, it is possible to allow the liquid resin 7' to more efficiently penetrate into the clearances in the side surface of the laminated battery 6 by controlling the pressure inside the chamber 101.

2.3.1. Pressure Control Unit

It is preferable that the manufacturing apparatus 100 further include a pressure control unit 104 that controls the pressure inside the chamber 101. For example, the pressure inside the chamber 101 is controlled by the pressure control unit 104 in the following way (a) and/or (b). As the advantageous effect of controlling the pressure inside the chamber 101 (atmospheric pressure) has been as described in the pressurization step and the depressurization step, description thereof will be omitted here. (a) The pressure inside the chamber 101 is raised (the inside of the chamber 101 is pressurized) after the liquid resin 7' is supplied from the resin supply unit 102 to only the side surface of the laminated battery 6 and before the liquid resin 7' is cured. (b) The pressure inside the chamber 101 is reduced (the inside of the chamber 101 is depressurized) after the laminated battery 6 is housed in the chamber 101 and before the liquid resin 7' is supplied from the resin supply unit 102 to only the side surface of the laminated battery 6.

2.3.2. Jig

It is preferable that the manufacturing apparatus 100 further include the jigs 105 that hold the laminated battery 6 while protecting end surfaces in the lamination direction of the laminated battery 6. The jigs 105 may be fixed inside the chamber 101, or may be detachably attached inside the chamber 101. If the manufacturing apparatus 100 includes the jigs 105, it is possible to supply the liquid resin 7' from the resin supply unit 102 to only the side surface of the laminated battery 6 while protecting the end surfaces in the lamination direction of the laminated battery 6 by the jigs 105, and thus to easily prevent an increase in volume of the battery in the lamination direction.

It is preferable that the manufacturing apparatus 100 further include transfer means (not shown) for transferring the jigs 105. The transfer means is means for transferring the laminated battery 6 along with the jigs 105 from outside the chamber 101 into the chamber 101 after the jigs 105 hold the laminated battery 6 outside the chamber 101.

2.3.3. Resin Curing Unit

It is preferable that the manufacturing apparatus 100 include a resin curing unit 106 that promotes the progress of curing of the liquid resin 7' supplied to the side surface of the laminated battery 6. For example, if the liquid resin 7' is a thermosetting resin, the manufacturing apparatus 100 preferably further includes a heating unit that heats at least the side surface of the laminated battery 6 as the resin curing unit 106. If the liquid resin 7' is a thermoplastic resin, the manufacturing apparatus 100 preferably further includes a cooling unit that cools at least the side surface of the laminated battery 6 as the resin curing unit 106. If the liquid resin 7' is an ultraviolet ray hardening resin, the manufacturing apparatus 100 preferably further includes an ultraviolet ray irradiation unit as the resin curing unit 106.

As has been described above, it is preferable that the manufacturing apparatus 100 include the other constituent parts in addition to the chamber 101 and the resin supply unit 102. The manufacturing apparatus 100 may be additionally provided with only one, or two or more of the pressure control unit 104, the jigs 105, and the resin curing unit 106.

For example, operating the manufacturing apparatus 100 as follows can manufacture an all-solid-state battery with enhanced energy density. In the following description, a form in which only one chamber is used will be described, but a plurality of chambers may be used to perform the steps in separate chambers. However, the number of the chambers is preferably one from the viewpoint of simplifying the configuration. (1) In a dry air environment, the end surfaces in the lamination direction of the laminated battery 6 are held between the jigs 105. (2) The jigs 105 are installed on the transfer means, and the transfer means is actuated to house the laminated battery 6 along with the jigs 105 into the chamber 101. (3) The inside of the chamber 101 is depressurized by the pressure control unit. Thus, air and moisture are removed from the laminated battery 6. (4) In the depressurized atmosphere, the liquid resin 7' is discharged from the resin supply unit 102 to the side surface of the laminated battery 6, and the liquid resin 7' is allowed to penetrate into the clearances in the side surface of the laminated battery 6 by a capillary action. Here, the end surfaces in the lamination direction of the laminated battery 6 are protected by the jigs 105, so that the liquid resin 7' does not adhere to these end surfaces. (5) The chamber 101 is opened and dry air is introduced into the chamber 101. Meanwhile, the liquid resin 7' is further forced into the clearances in the side surface of the laminated battery 6 by the differential pressure. (6) The jigs 105 are taken out from the chamber 101. Then, the laminated battery 6 along with the jigs 105 is installed inside the resin curing unit 106 in the apparatus, and the resin curing unit 106 is actuated to cure the liquid resin 7' and form the cured resin layer 7.

3. All-Solid-State Battery

Figure 9A:
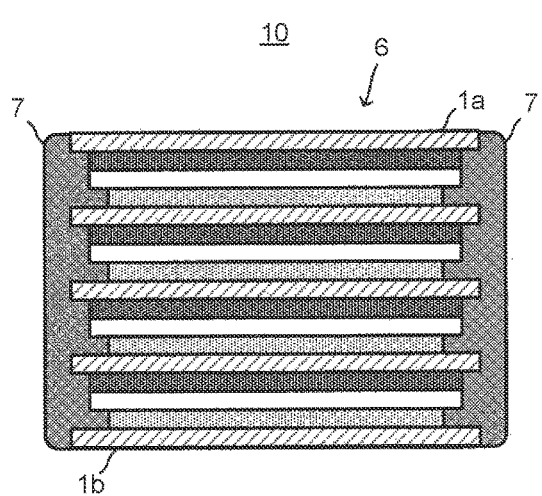
FIG. 9A is a schematic sectional view illustrating an all-solid-state battery.
Figure 9B:
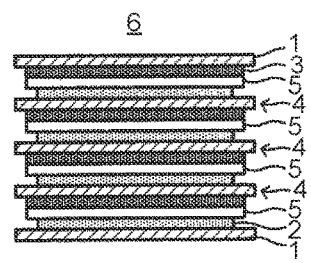
FIG. 9B is a schematic sectional view illustrating the all-solid-state battery.
Figure 9C:
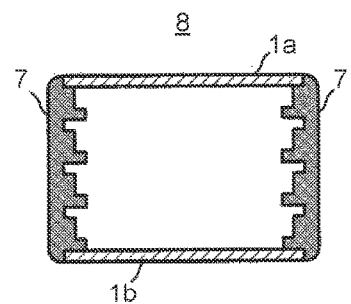
FIG. 9C is a schematic sectional view illustrating the all-solid-state battery.

The manufacturing method for an all-solid-state battery has been described above. Now, an all-solid-state battery itself will be described with reference to FIGS. 9A, 9B, and 9C. In FIGS. 9A, 9B, and 9C, the same members as those already described are denoted by the same reference signs, and description thereof will be omitted. As shown in FIGS. 9A, 9B, and 9C, the all-solid-state battery 10 includes: the laminated battery 6 formed by laminating the pluralities of collector layers 1, positive electrode mixture layers 2, solid electrolyte layers 5, and negative electrode mixture layers 3; outermost collector layers 1a, 1b constituting both end surfaces in the lamination direction of the laminated battery 6; and the resin 7 coating only the side surface of the laminated battery 6. At least one layer of the collector layer 1, the positive electrode mixture layer 2, the solid electrolyte layer 5, and the negative electrode mixture layer 3 is protruded outward relative to the other layers to form a protruding layer, and a plurality of protruding layers protrude from the side surface of the laminated battery 6. The resin 7 has penetrated into a clearance between one protruding layer and another protruding layer. A battery case 8 that seals the laminated battery 6 except for the outermost collector layers 1a, 1b is formed by the outermost collector layers 1a, 1b and the resin 7, and the outermost collector layers 1a, 1b serve as battery terminals.

Thus, in the all-solid-state battery 10, the outermost collector layers 1a, 1b are exposed in both end surfaces in the lamination direction of the laminated battery 6, and an increase in volume of the battery in the lamination direction caused by resin sealing is suppressed. As the battery case 8 is formed by the outermost collector layers 1a, 1b and the resin 7 (FIG. 9C), it is not necessary to separately seal the all-solid-state battery 10 in a laminate package etc. Moreover, as the outermost collector layers 1a, 1b serve also as battery terminals, it is not necessary to separately provide terminals. In this respect, too, further space saving can be achieved. Thus, with an increase in volume suppressed from multiple viewpoints, the all-solid-state battery 10 has significantly enhanced energy density.

As already described, in the case where the collector layer 1, the positive electrode mixture layer 2, and the negative electrode mixture layer 3 do not constitute a bipolar electrode layer, it is necessary to connect with a lead wire etc. a plurality of positive electrode collector layers of the laminated battery 6 to one another and a plurality of negative electrode collector layers of the laminated battery 6 to one another. In this case, ends of the lead wire can be formed by the outermost collector layers so that electricity can be taken out from the outermost collector layers. However, from the viewpoint of further enhancing the energy density, it is preferable that the collector layer 1, the positive electrode mixture layer 2, and the negative electrode mixture layer 3 constitute the bipolar electrode layer 4 in the all-solid-state battery 10 as shown in FIG. 9B.

4. Preferred Form of Jig Used for Manufacturing Method and Manufacturing Apparatus According to new findings by the present inventors, when supplying the liquid resin 7' to only the side surface of the laminated battery 6 in the second step S2, it is possible to efficiently supply the resin 7' to only the side surface of the laminated battery 6 by using a jig that has a predetermined tapered side surface.

Figure 10:
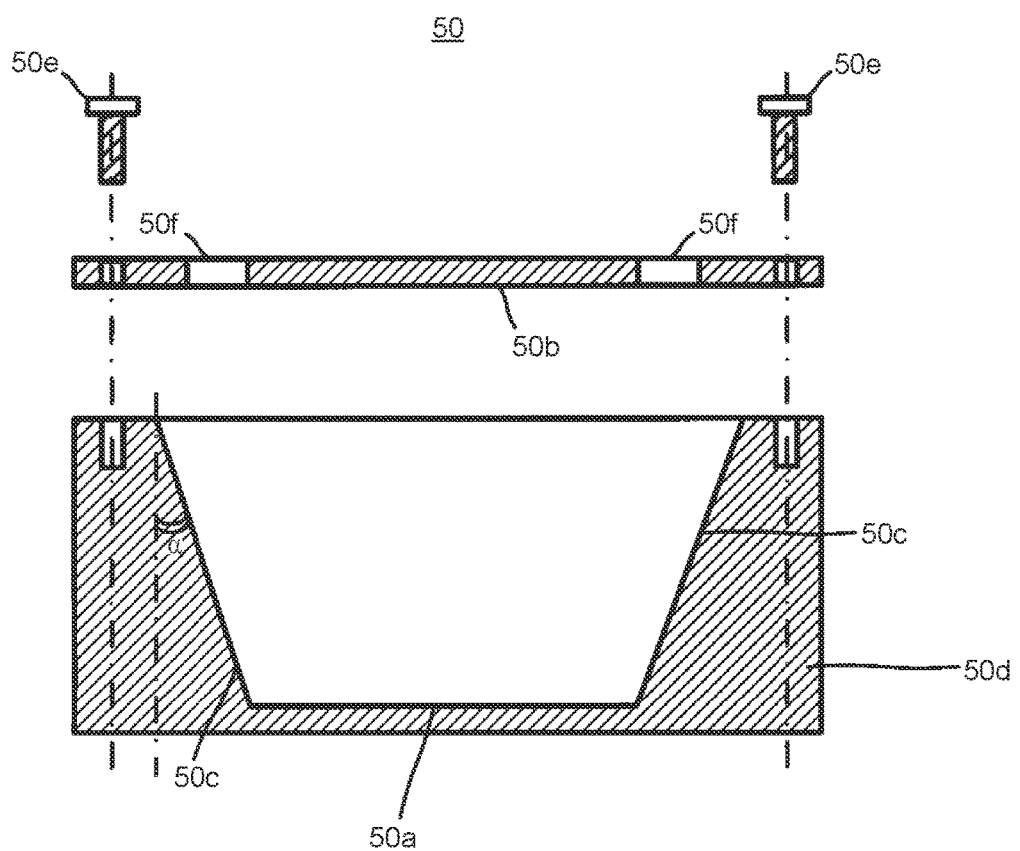
FIG. 10 is a schematic sectional view illustrating a jig.

FIG. 10 schematically shows a cross-section of a jig 50 having a predetermined tapered side surface. As shown in FIG. 10, the jig 50 has a lower bottom surface 50a covering one end surface in the lamination direction of the laminated battery 6, an upper cover member 50b covering the other end surface in the lamination direction of the laminated battery 6, and a side surface 50c tapered from the upper cover member 50b toward the lower bottom surface 50a. The jig 50 should be rigid and heat-resistant as a whole. For example, the jig 50 is preferably made of a metal material such as stainless steel.

As shown in FIG. 10, it is preferable that the lower bottom surface 50a and the side surface 50c of the jig 50 be integrally formed. In other words, as shown in FIG. 10, it is preferable that a bottom surface of a recess of a sunken stage 50d form the lower bottom surface 50a, and that a side wall of this recess form the side surface 50c. On the other hand, it is preferable that the stage 50d and the upper cover member 50b be discretely formed. In this case, it is preferable that the stage 50d and the upper cover member 50b can be coupled together through fixing members 50e. Thus, after the laminated battery 6 is installed inside the recess, both end surfaces in the lamination direction of the laminated battery 6 can be pressed by the upper cover member 50b and the lower bottom surface 50a, so that the clearances between the layers of the laminated battery 6 become stable and warping at ends of the laminated battery 6 etc. can be prevented. Moreover, pressing both end surfaces in the lamination direction of the laminated battery 6 by the upper cover member 50b and the lower bottom surface 50a can easily prevent the resin 7' from flowing around to both end surfaces in the lamination direction of the laminated battery 6.

As shown in FIG. 10, the jig 50 is provided with supply ports 50f in the upper cover member 50b, and the resin 7' can be supplied to a space inside the jig through the supply ports 50f. The supply ports 50f are provided in a covering surface of the upper cover member 50b at a part that does not come in contact with the end surface in the lamination direction of the laminated battery 6 (see FIG. 11). Thus, the resin 7' can be easily supplied to only the side surface of the laminated battery 6.

As shown in FIG. 10, the side surface 50c is tapered from the upper cover member 50b toward the lower bottom surface 50a, and in other words, is inclined at a taper angle α. Here, the taper angle α may be any angle larger than 0°. The taper angle is preferably not smaller than 10°. The upper limit may be any angle smaller than 90°. The upper limit is preferably not larger than 50°. The taper angle α is more preferably not smaller than 20° and not larger than 40°, and particularly preferably 30°. If the side surface 50c is not tapered, the resin 7' may concentrate from a lower stage to a middle stage of the laminated battery, so that the resin may fail to be efficiently fed to the layer in the uppermost stage. Tapering the side surface 50c can prevent this situation. Tapering the side surface 50c has another effect of making it easy to take out the all-solid-state battery 10 from the jig 50 without damaging the battery.

Here, it is preferable that surfaces of the jig 50 that come in contact with the laminated battery 6 or the liquid resin 7' be coated with fluororesin. Thus, when the all-solid-state battery 10 is taken out from the jig 50, the resin 7 can be prevented from sticking to the jig 50 and peeling off the all-solid-state battery 10. As fluororesin is an insulator, short-circuit of the battery can be prevented even if the terminal etc. of the laminated battery 6 comes in contact with the fluororesin coating.

In the above manufacturing method, it is preferable that the second step S2 be performed with the laminated battery 6 installed in a space of such a jig 50. Specifically, in the manufacturing method, it is preferable that the second step S2 be performed while the laminated battery 6 is held by the jig, and that the jig used be the jig 50 having the lower bottom surface 50a covering one end surface in the lamination direction of the laminated battery 6, the upper cover member 50b covering the other end surface in the lamination direction of the laminated battery 6, and the side surface 50c tapered from the upper cover member 50b toward the lower bottom surface 50a.

Specifically, as shown in FIG. 11A, the laminated battery 6 is placed on the lower bottom surface 50a of the jig 50, and the laminated battery 6 is held while both end surfaces in the lamination direction are pressed by the upper cover member 50b and the lower bottom surface 50a. Next, as shown in FIG. 11B, the liquid resin 7' is supplied from the supply ports 50f of the upper cover member 50b into the space inside the jig 50. Thus, as shown in FIG. 11C, the resin 7' can be efficiently supplied to only the side surface of the laminated battery 6. Here, as the side surface 50c of the jig 50 has a predetermined taper angle α, the resin 7' flows so as to approach the side surface of the laminated battery 6. Thus, a large amount of resin 7' can be supplied to the side surface of the laminated battery 6, as well as an outflow of the resin 7' supplied to the side surface of the laminated battery 6 can be suppressed. As a result, the liquid resin 7' is allowed to efficiently penetrate into the clearance X between one protruding layer and another protruding layer of the laminated battery 6.

In the manufacturing method, the third step S3 of curing the liquid resin can be performed while the laminated battery 6 is held in the jig 50. For example, if a thermosetting resin is used as the liquid resin, the thermosetting resin can be cured by heating the laminated battery 6 along with the jig 50 inside a heating device.

<Manufacturing of All-Solid-State Battery>

EXAMPLE

As an example, a resin is introduced into clearances of a laminated battery by applying a capillary underfill method, and the laminated battery was thus sealed with the resin. Specifically, a bipolar laminated battery (having a size of 73 mm×73 mm, a lamination height of 2.88 mm, a protrusion length of the protruding layer from the side surface of 2 mm, and a width of the clearance between one protruding layer and another protruding layer of 0.2 mm) was prepared, and the end surfaces in the lamination direction of this laminated battery were held between jigs (stainless-steel (SUS) jigs each having a size of 150 mm×150 mm, with a fluorine plate built in a part that comes in contact with an all-solid-state battery). These jigs were set inside a chamber of an apparatus similar to that shown in FIG. 8. The inside of the chamber was depressurized to 130 Pa. In the depressurized chamber, a liquid resin (SUF1575-9 by Namics Corporation) was supplied from a dispenser nozzle to only the side surface of the laminated battery at the rate of supply of 7000 PPS until the amount applied reached 1115 mg. Sixty seconds after the completion of resin application, a door of the chamber was opened and dry air was introduced into the chamber. Thereafter, the jigs were taken out from the chamber, and the laminated battery was heated in an oven at 80° C. for 150 minutes to cure the liquid resin.

Reference Example

As a reference example, a resin was introduced into clearances of a laminated battery by applying an injection molding method, and the laminated battery was thus sealed with the resin. Specifically, the resin was injected to the side surface of a bipolar laminated battery, similar to that of the above example, to seal the battery with the resin.

<Evaluation of All-Solid-State Battery>

Figure 12:
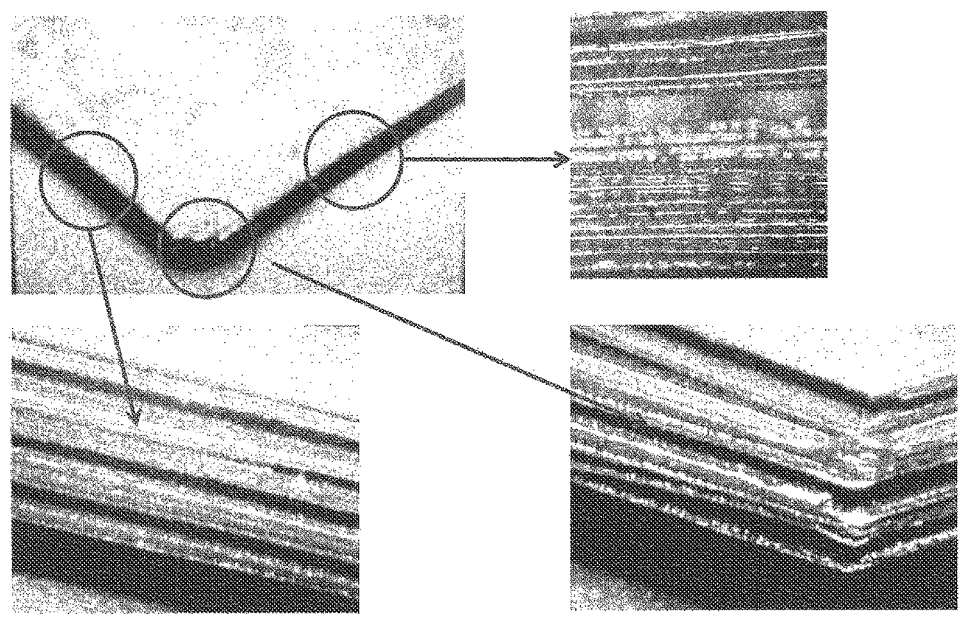
FIG. 12 is photographs illustrating results of an example.
Figure 13:
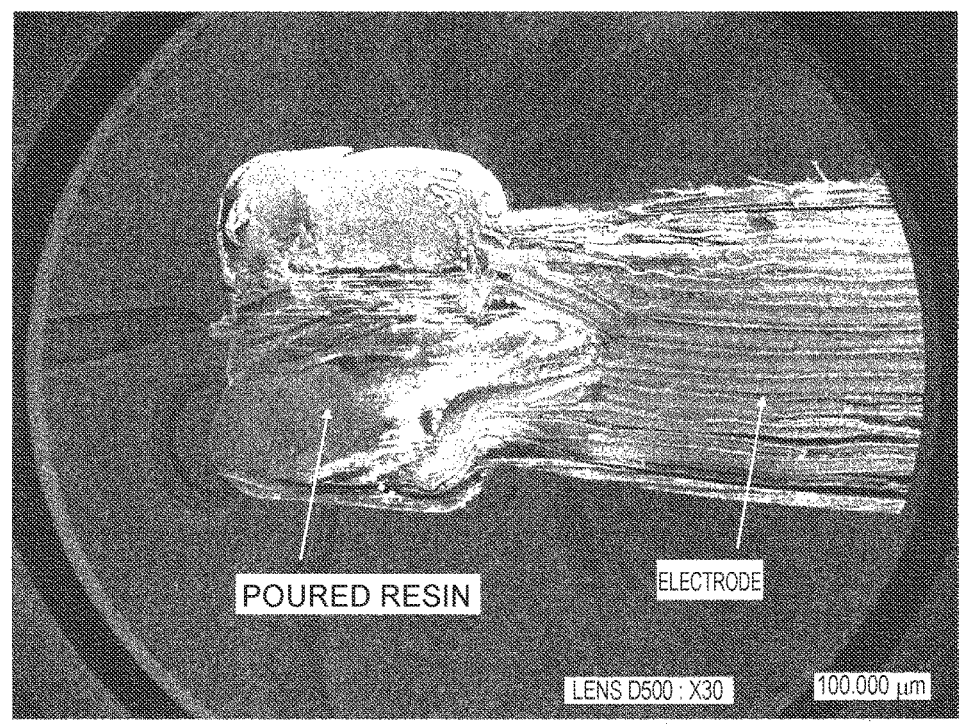
FIG. 13 is a photograph illustrating results of a reference example.

As shown in FIG. 12, in the all-solid-state battery according to the example, the resin was successfully fed deep into the clearances in the side surface of the laminated battery. In addition, generation of voids was suppressed and no short-circuit of the battery occurred, so that the laminated battery could be charged and discharged appropriately through the outermost collector layers. Moreover, the laminated battery was sealed appropriately with the outermost collector layers and the resin, as well as adequate strength was secured. As the outermost collector layers served as the battery terminals, the battery was ready for use without the need for separately housing the battery in a battery case such as a laminate package.

When the side surface of the all-solid-state battery produced as in the reference example was observed, it was found that the resin was unevenly packed in the clearances, that the lamination structure had significantly collapsed, and that there were numerous voids inside the resin. Moreover, the resin flowed out beyond the side surface of the laminated battery to both end surfaces in the lamination direction. Thus, it proved to be difficult to feed a resin by the injection molding method while maintaining the narrow clearances.

<Study of Jig>

Figure 11:
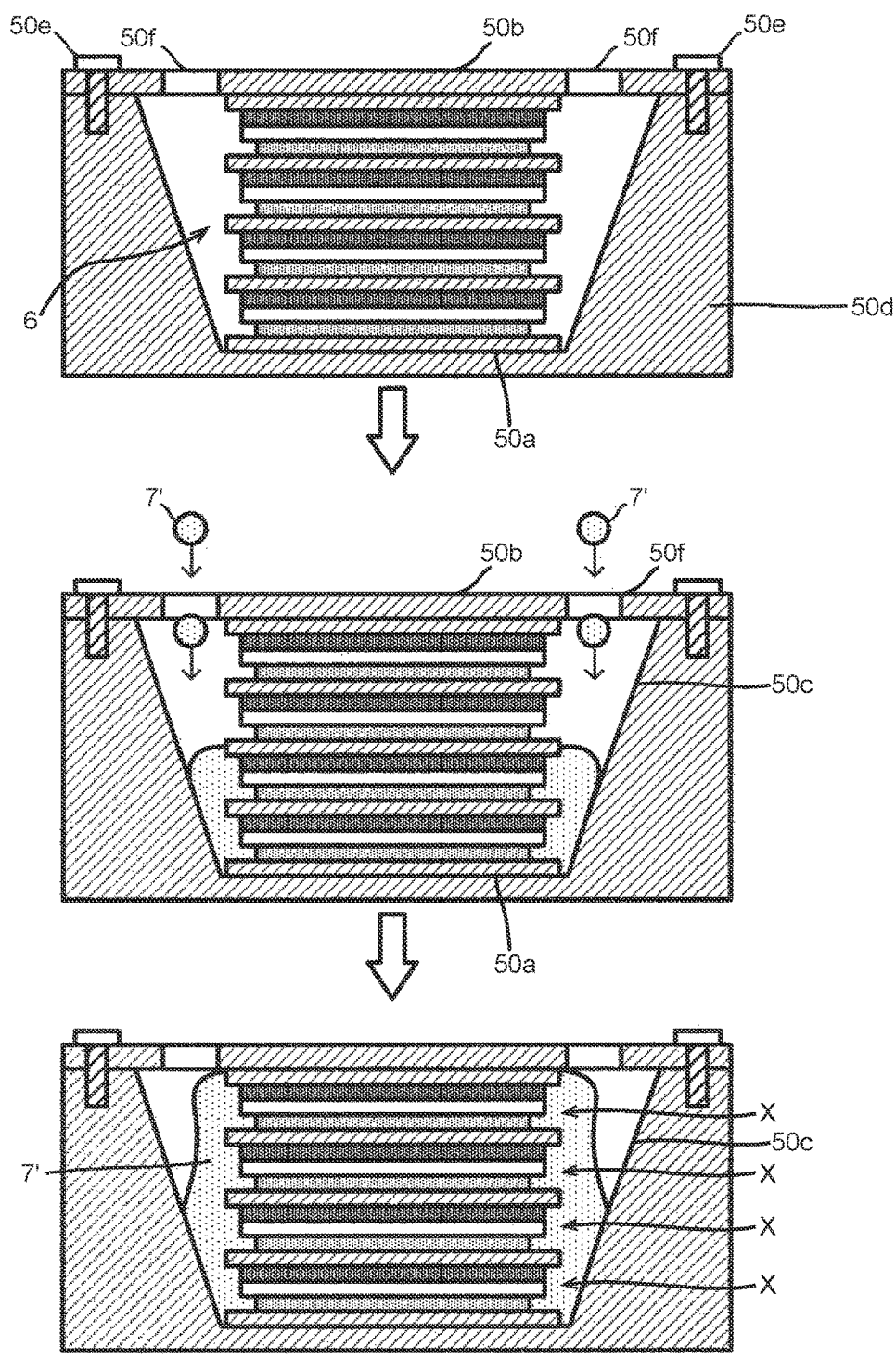
FIG. 11 is a schematic sectional view illustrating a case where step S2 is performed using the jig.

An all-solid-state battery was manufactured by feeding a resin to only the side surface of a laminated battery by the same method as in the above example while holding the laminated battery using a jig of which the side surface had a taper angle α as shown in FIGS. 10 and 11. The taper angle α was varied, and the sealed state of the battery and the external appearance of the battery at each taper angle α were visually observed. Table 1 below shows the results.

In Table 1 below, the sealed state and the external appearance of the all-solid-state battery are rated as very good, good, or equivalent in comparison to those in the case of the taper angle of 0°.

TABLE 1

| Taper Angle α | Sealed State | External Appearance | Remarks |
|---|---|---|---|
| 0° | Equivalent | Equivalent | Part of the resin applied flowed out to a lower part of the battery. |
| 10° | Good | Good | Compared with the case of 0°, a larger amount of resin was packed into the battery. |
| 30° | Very good | Very good | Compared with the case of 0°, a significantly larger amount of resin was packed into the battery. |
| 50° | Very good | — | Compared with the case of 0°, a larger amount of resin was packed into the battery. However, the resin climbed up to an upper stage of the battery, which spoiled the finished appearance. |

As shown in Table 1, tapering the side surface of the jig at some taper angle α resulted in a better sealed state of the all-solid-state battery. When the finished external appearance is also taken into account, a preferable taper angle α is not smaller than 10° and not larger than 50°, and the most preferable taper angle α is not smaller than 20° and not larger than 40°.

According to findings of the present inventors, when an all-solid-state battery is manufactured by an injection molding method as in the reference example, the resin is injected into the jig onto the laminated battery that is placed horizontally, so that, even if the side surface of the jig is tapered, the resin cannot be fed evenly into the clearances between the layers in the side surface of the laminated battery. Specifically, in the injection molding method, the resin is injected into the jig by pouring the resin at once by a cylinder etc. Thus, a large pressure is applied to the clearances between the layers of the laminated battery, so that, whether the side surface of the jig is tapered or not, the resin cannot be fed evenly into the clearances between the layers of the laminated battery.

On the other hand, when an all-solid-state battery is manufactured by a molding method, an action of forcing in the resin using a squeegee is required. Thus, a large amount of resin is fed into the laminated battery, so that, even if the side surface of the jig is tapered, the resin cannot be fed evenly into the clearances between the layers in the side surface of the laminated battery. Specifically, in the molding method, a mask is put over a laminated battery and the resin is poured from an upper part of the laminated battery while being forced in by a squeegee. Thus, an excessive amount of resin relative to the amount of resin inserted into the laminated battery is supplied, so that, whether the side surface of the jig is tapered or not, the resin cannot be fed evenly into the clearances between the layers of the laminated battery.

The all-solid-state battery manufactured by the manufacturing method of the present disclosure has high energy density, and can be used, for example, as a large-size power source to be mounted in a vehicle.

Conventionally, persons skilled in the technical field of all-solid-state batteries have not considered the possibility of supplying a resin to only the side surface of a laminated battery to seal the laminated battery with the resin. This is because of the belief that a large amount of resin needs to be supplied to all surfaces of a laminated battery to appropriately seal the laminated battery with the resin by the conventional methods (the dipping method, the casting method, the insert molding method, etc.) as shown in JP 2000-251858 A, JP 2015-018769 A, and the above reference example. Conventionally, persons skilled in the art have not considered the possibility of using an all-solid-state battery as is without housing the battery in a laminate package, either. By contrast, the present application has disclosed the manufacturing method for an all-solid-state battery that applies a capillary underfill method, the possibility of which has never been considered by those skilled in the art. As described above, the present application has disclosed how simply supplying a small amount of resin to only the side surface of a laminated battery can appropriately seal the laminated battery with the resin, and has also disclosed a new form of the all-solid-state battery of which the battery case is formed by the resin and the collector layers.

What is claimed is:

1. A manufacturing method for an all-solid-state battery, the manufacturing method comprising:
   producing a laminated battery having both end surfaces in a lamination direction and a side surface by laminating pluralities of collector layers, positive electrode mixture layers, solid electrolyte layers, and negative electrode mixture layers, producing the laminated battery by protruding at least one layer of the collector layer, the positive electrode mixture layer, the solid electrolyte layer, and the negative electrode mixture layer relative to remaining of the collector layer, the positive electrode mixture layer, the solid electrolyte layer, and the negative electrode mixture layer to form a protruding layer, and protruding a plurality of protruding layers from the side surface of the laminated battery;
   supplying a liquid resin to only the side surface of the laminated battery, supplying the liquid resin including supplying the liquid resin to only the side surface of the laminated battery such that the liquid resin penetrates into a clearance between one protruding layer and another protruding layer; and
   curing the liquid resin.

2. The manufacturing method according to claim 1, further comprising, after completion of supplying the liquid resin and before start of curing the liquid resin, raising an atmospheric pressure above an atmospheric pressure at which the liquid resin is supplied.

3. The manufacturing method according to claim 1, further comprising, after completion of producing the laminated battery and before start of supplying the liquid resin, reducing an atmospheric pressure below an atmospheric pressure at which the laminated battery is produced.

4. The manufacturing method according to claim 1, further comprising, after completion of producing the laminated battery and before start of supplying the liquid resin, covering both end surfaces in the lamination direction of the laminated battery with a cover member, wherein supplying the liquid resin includes protecting both end surfaces in the lamination direction of the laminated battery from the liquid resin by the cover member.

5. The manufacturing method according to claim 1, wherein the resin is supplied while the laminated battery is held by a jig, the jig having a lower bottom surface covering one end surface in the lamination direction of the laminated battery, an upper cover member covering the other end surface in the lamination direction of the laminated battery, and a side surface tapered from the upper cover member toward the lower bottom surface.

6. The manufacturing method according to claim 1, wherein producing the laminated battery includes forming a bipolar electrode layer by the collector layer, the positive electrode mixture layer, and the negative electrode mixture layer.

7. An apparatus that manufactures an all-solid-state battery by supplying a liquid resin to only a side surface of a laminated battery and then curing the liquid resin on the laminated battery, the laminated battery having both end surfaces in a lamination direction and the side surface and in which a plurality of protruding layers protrude from the side surface, with a clearance left between one protruding layer and another protruding layer, the apparatus comprising:
   a chamber configured to house the laminated battery; and
   a resin supply unit configured to supply a liquid resin to only the side surface of the laminated battery housed in the chamber.

8. The apparatus according to claim 7, further comprising a pressure control unit configured to control a pressure inside the chamber, the pressure control unit being configured to relatively raise the pressure inside the chamber after the liquid resin is supplied from the resin supply unit to only the side surface of the laminated battery and before the liquid resin is cured.

9. The apparatus according to claim 8, wherein the pressure control unit is configured to relatively reduce the pressure inside the chamber after the laminated battery is housed in the chamber and before the liquid resin is supplied from the resin supply unit to only the side surface of the laminated battery.

10. The apparatus according to claim 7, further comprising a pressure control unit configured to control a pressure inside the chamber, the pressure control unit being configured to relatively reduce the pressure inside the chamber after the laminated battery is housed in the chamber and before the liquid resin is supplied from the resin supply unit to only the side surface of the laminated battery.

11. The apparatus according to claim 7, further comprising a jig configured to hold the laminated battery while protecting the end surfaces in the lamination direction of the laminated battery, wherein the liquid resin is supplied from the resin supply unit to only the side surface of the laminated battery in a state where the jig protects the end surfaces in the lamination direction of the laminated battery.

12. The apparatus according to claim 11, wherein the jig has a lower bottom surface covering one end surface in the lamination direction of the laminated battery, an upper cover member covering the other end surface in the lamination direction of the laminated battery, and a side surface tapered from the upper cover member toward the lower bottom surface.

13. The apparatus according to claim 7, further comprising a jig configured to hold the laminated battery while protecting the end surfaces in the lamination direction of the laminated battery, the jig having a lower bottom surface covering one end surface in the lamination direction of the laminated battery, an upper cover member covering the other end surface in the lamination direction of the laminated battery, and a side surface tapered from the upper cover member toward the lower bottom surface.

14. The apparatus according to claim 7, further comprising a heating unit that heats at least the side surface of the laminated battery.

15. The apparatus according to claim 7, further comprising a cooling unit that cools at least the side surface of the laminated battery.

16. An all-solid-state battery, comprising:
   a laminated battery formed by laminating pluralities of collector layers, positive electrode mixture layers, solid electrolyte layers, and negative electrode mixture layers;

outermost collector layers constituting both end surfaces in a lamination direction of the laminated battery; and a resin coating only a side surface of the laminated battery, wherein at least one layer of the collector layer, the positive electrode mixture layer, the solid electrolyte layer, and the negative electrode mixture layer is protruded outward relative to remaining of the collector layer, the positive electrode mixture layer, the solid electrolyte layer, and the negative electrode mixture layer to form a protruding layer, and a plurality of protruding layers protrude from the side surface of the laminated battery, the resin has penetrated into a clearance between one protruding layer and another protruding layer, and a battery case that seals the laminated battery except for the outermost collector layers is formed by the outermost collector layers and the resin, and the outermost collector layers serve as battery terminals.

17. The all-solid-state battery according to claim 16, wherein the collector layer, the positive electrode mixture layer, and the negative electrode mixture layer constitute a bipolar electrode layer.

\* \* \* \* \*